12) United States Patent
Steiger

(10) Patent No.: US 10,699,551 B1
(45) Date of Patent: Jun. 30, 2020

(54) OUTDOOR WI-FI ENABLED FLUID LEVEL ALARM

(71) Applicant: Scott J. Steiger, St. Louis, MO (US)

(72) Inventor: Scott J. Steiger, St. Louis, MO (US)

(*) Notice: Subject to any disclaimer, the term of this patent is extended or adjusted under 35 U.S.C. 154(b) by 0 days.

(21) Appl. No.: 16/158,859

(22) Filed: Oct. 12, 2018

Related U.S. Application Data

(60) Provisional application No. 62/574,134, filed on Oct. 18, 2017.

(51) Int. Cl.
*G08B 21/18* (2006.01)
*G01F 23/00* (2006.01)
*G08B 21/20* (2006.01)
*G08B 25/00* (2006.01)

(52) U.S. Cl.
CPC ........... *G08B 21/182* (2013.01); *G01F 23/00* (2013.01); *G08B 21/20* (2013.01); *G08B 25/007* (2013.01)

(58) Field of Classification Search
CPC .... G08B 21/182; G08B 21/20; G08B 25/007; G01F 23/00
USPC ........................................................ 340/540
See application file for complete search history.

(56) References Cited

U.S. PATENT DOCUMENTS

| | | | |
|---|---|---|---|
| 4,369,438 A | 1/1983 | Wilhelmi | |
| 4,523,460 A * | 6/1985 | Strickler | G01F 15/007 73/200 |
| 5,232,758 A | 8/1993 | Juskey et al. | |
| 5,672,050 A | 9/1997 | Webber et al. | |
| 7,463,160 B2 * | 12/2008 | Crook | G08B 21/14 340/531 |
| 8,386,303 B2 | 2/2013 | McKinney | |
| 8,737,672 B1 | 5/2014 | George | |
| 9,085,961 B2 | 7/2015 | Ehalt | |
| D740,329 S | 10/2015 | Gilbert et al. | |
| 9,177,461 B2 | 11/2015 | Middleton | |
| 9,500,193 B2 | 11/2016 | Knight et al. | |
| 9,528,873 B2 * | 12/2016 | Cummings | G01F 23/603 |
| 9,582,987 B2 | 2/2017 | Eskildsen et al. | |
| 9,590,537 B2 | 3/2017 | Pasche et al. | |
| 9,696,360 B2 | 7/2017 | Rothbart | |
| 9,927,479 B2 | 3/2018 | Rothbart | |
| 10,358,286 B2 * | 7/2019 | Bartz | B65D 90/02 |
| 2003/0210140 A1 * | 11/2003 | Menard | E03D 7/00 340/531 |
| 2004/0149436 A1 * | 8/2004 | Sheldon | E21B 47/0007 166/250.15 |
| 2007/0175633 A1 * | 8/2007 | Kosmala | E21B 47/0007 166/250.15 |

(Continued)

*Primary Examiner* — Jack K Wang
(74) *Attorney, Agent, or Firm* — Creativenture Law, LLC; Dennis J M Donahue, III; Kevin Staed

(57) ABSTRACT

The invention is a Wi-Fi enabled fluid level alarm that is suitable for direct service outdoors. The alarm is preferably used in a sump pump, septic system or similar fluid pumping system and has a fluid sensor within the system communicating with the alarm to alert a homeowner when the fluid sensor indicates a certain fluid threshold has been met. The sensor relays information through an onsite alarm device to a centralized monitoring computer which processes the data and subsequently alerts a homeowner of the high fluid level, or other data, provided by their alarm system. Additionally, the system monitors alarm power and network connection through a health pulse notification systems that sends intervals of data to the central server.

20 Claims, 8 Drawing Sheets

(56) References Cited

U.S. PATENT DOCUMENTS

| | | | | |
|---|---|---|---|---|
| 2014/0343736 A1* | 11/2014 | Meyer | ............... | G01M 3/18 |
| | | | | 700/283 |
| 2017/0234117 A1* | 8/2017 | Kidd | ............... | F04B 17/03 |
| | | | | 166/250.15 |
| 2018/0356512 A1* | 12/2018 | Alkhabbaz | ............... | G01S 13/758 |
| 2018/0363639 A1* | 12/2018 | Cathell | ............... | F04B 49/06 |

* cited by examiner

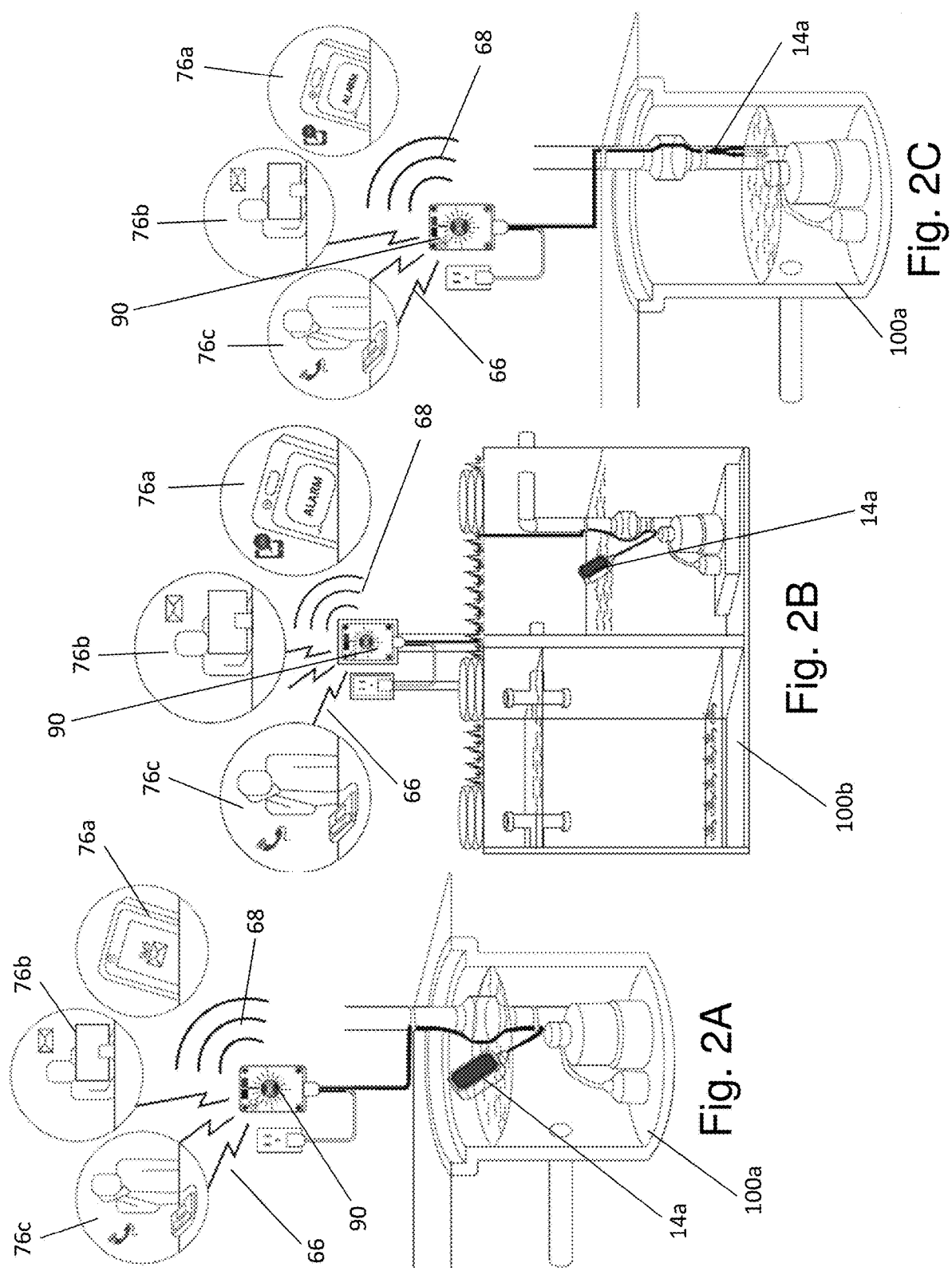

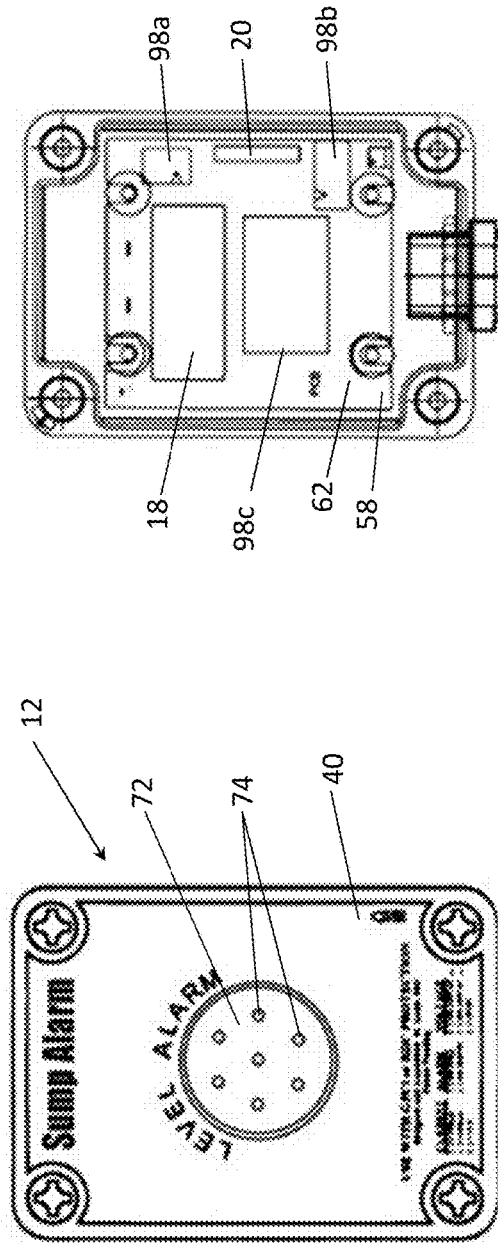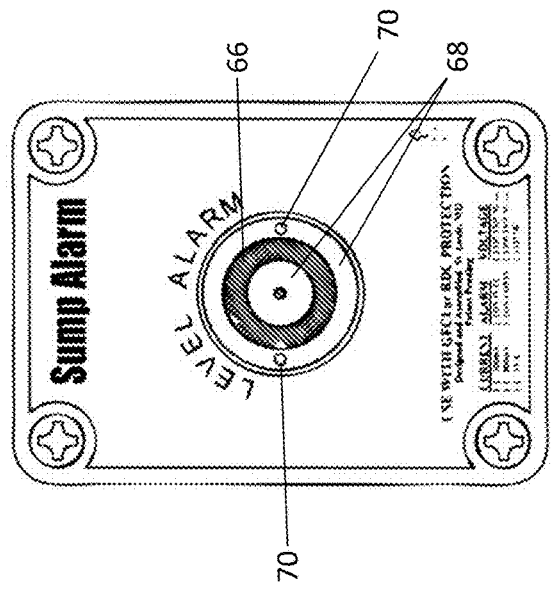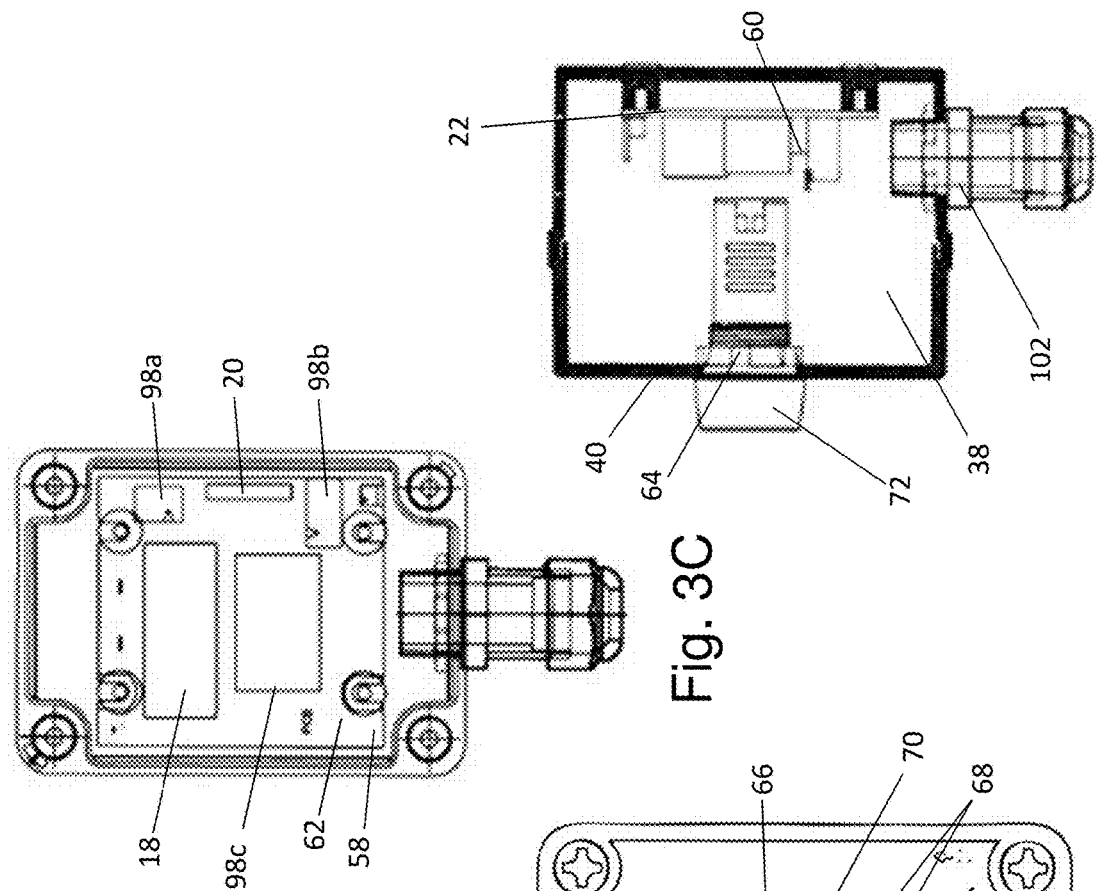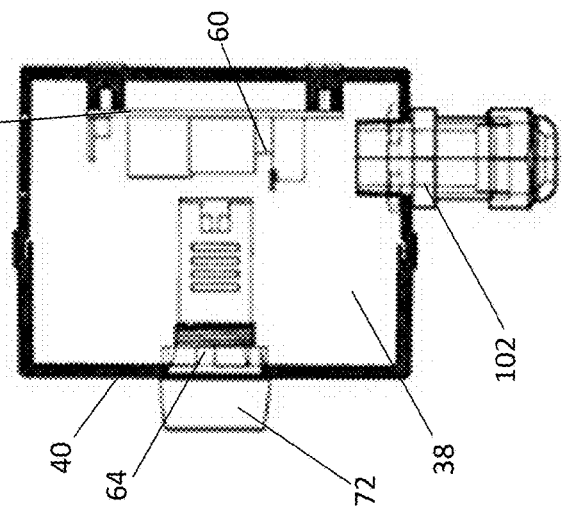
Fig. 3A
Fig. 3B
Fig. 3C
Fig. 3D

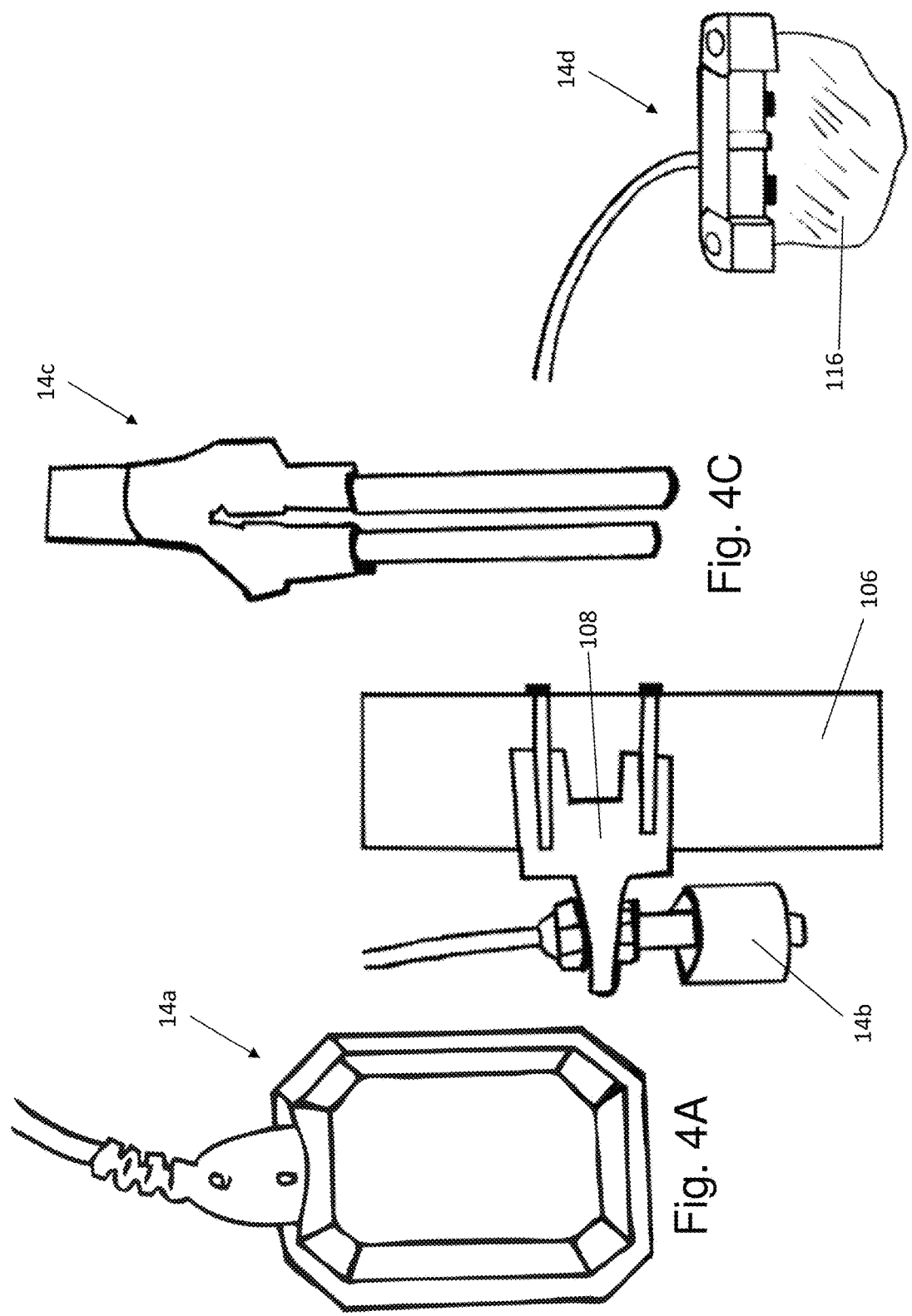

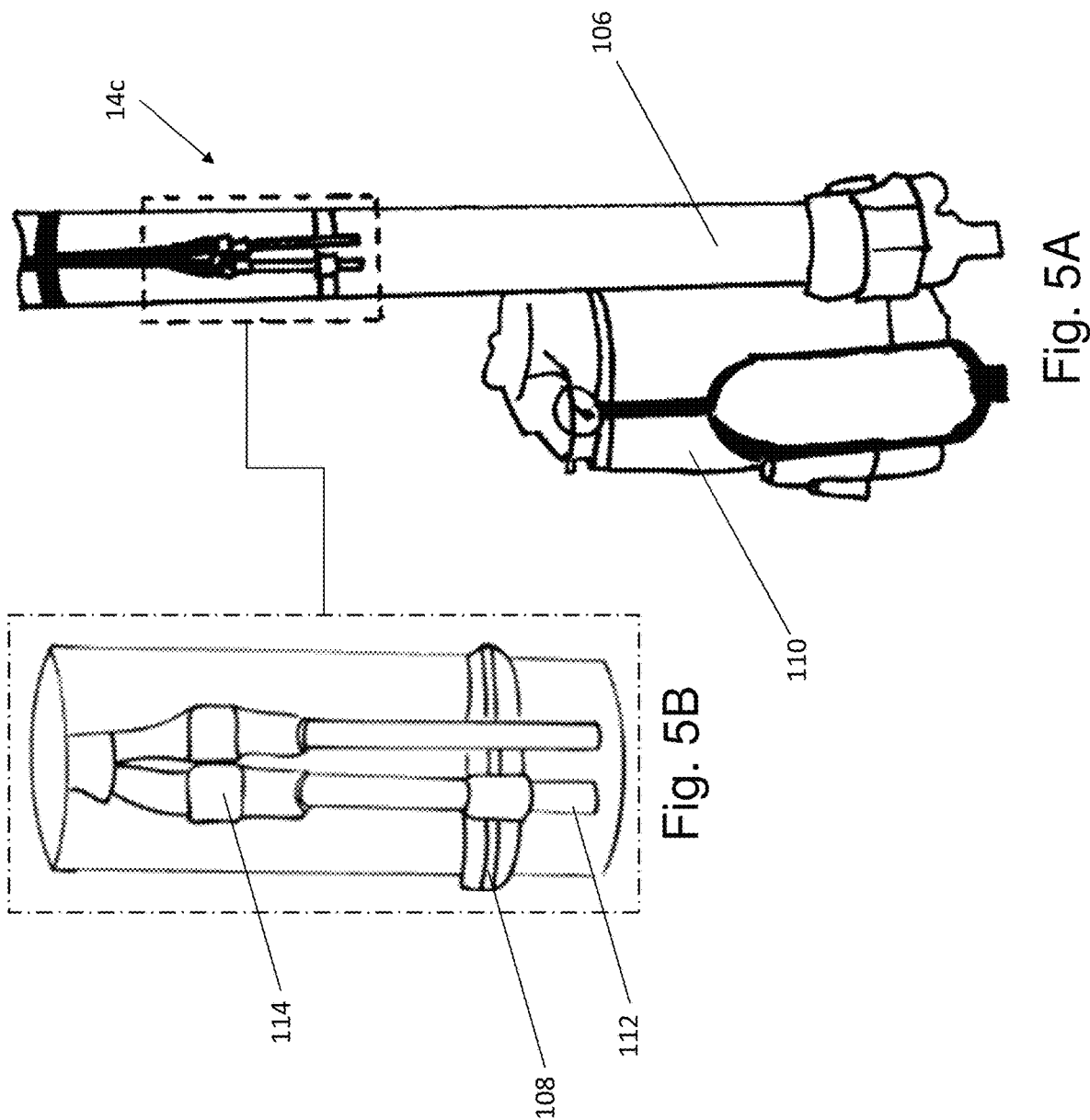

OUTDOOR WI-FI ENABLED FLUID LEVEL ALARM

CROSS-REFERENCE TO RELATED APPLICATIONS

This application claims priority from U.S. Provisional Patent Application No. 62/574,134 filed on Oct. 18, 2017 which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to high and low level fluid level alarms, and more particularly to outdoor high and low level fluid level alarms that monitor pump systems and fluid levels within a sump or similar reservoir.

Related Art

Fluid level alarms have been used in combination with fluid pumps and fluid level monitoring systems to notify users when the fluid level reaches a certain threshold, for example water within a sump or effluent in a septic system. Examples of such high fluid level alarms are most commonly seen in residential sump pump and septic systems in both indoor and outdoor configurations. Most fluid level alarms either have an audible or visual alarm or a combination of the two to notify the homeowner when fluid has reached or exceeded a predefined level. In operation traditional alarms sound a horn when a fluid sensor within the pump system detects the fluid level has reached the threshold level. However, a problem arises in these systems where the alarm will only sound if the entire system has power. Accordingly, should the pump and alarm system lose power a user will not be notified of a high fluid level and the high fluid alarm is thus rendered ineffective. Failure of such a system is particularly a problem where events that tend to cause power loss, such as heavy storms, present an increased risk of high fluid levels and flooding in residential homes. Accordingly, it is a desire to those having an ordinary skill in the art to provide high fluid level alarms capable of operating even when the main power supply has been lost.

One of the traditional challenges with outdoor alarms has been the handling and management of power failures. Problems exist with pumps and alarm systems in the prior art were pumps are known to have a large amp load, and often trip breakers. Further, pumps are installed where there is water, which by code require ground-fault circuit interrupter ("GFCI") protection, adding another potential power outage source for the pump. In operation, outdoor conduits with conductors often fill with water along with tree roots and other hazards for underground conduits, which are the typical mode of power delivery for outdoor sump pumps septic systems, lift stations, and grinder pumps. If the pump and the alarm are plugged into the same circuit, the alarm will not sound on a high level alarm. A tripped breaker indicates the pump cannot work and of course will invariably result in a problem that will likely include property damage To combat the aforementioned power loss problem, known fluid level alarms are typically outfitted with a 9 volt DC alkaline backup battery that powers the pump alarm should the main AC power source fail or require separate circuits to the pump location for operating the pump and the alarm. These systems will still sound an audible alert, visual alert or a combination of the two to alert the home owner when high fluid is detected even when the alarm has lost its main power source. However, providing a second circuit is costly and is fallible to many of the same hazards as a single circuit. Further, supposing the 9 volt DC alkaline backup battery does have a charge, the alarm will not sound on loss of power, but will delay until the fluid level gets too high to begin sounding the alarm. The alarm will require a user to be locally present to understand that the system has a problem, and begin the troubleshooting to find the problem. This could be a failed pump, tripped GFCI, tripped breaker, blocked pump discharge, failed check valve, or other similar failure.

Generally, these known high fluid level alarms are hardwired to the pump control panel and communicate with the pump or other high fluid monitoring system byway of the wired connection and the alerting mechanism is physically connected to the alarm box. However, other high fluid level alarms with visual and audible alerts are not only hardwired to pumps and fluid level monitoring systems but also are in wireless communication with an internet network, such as in U.S. Pat. No. 9,500,193 (METHOD OF CONTROLLING A PUMP AND MOTOR), U.S. Pat. No. 9,696,360 (SUMP/EJECTOR PUMP MONITOR AND SUMP/EJECTOR PUMP FAILURE WARNING SYSTEM) and U.S. Pat. No. 9,927,479 (SUMP/EJECTOR PUMP MONITOR AND SUMP/EJECTOR PUMP FAILURE WARNING SYSTEM). Accordingly, these systems are not only capable of alerting homeowners with the audio/visual alarm but are also capable of relaying information collected from the fluid level monitoring system to remote locations via internet, Wi-Fi or a similar wireless network.

However, a problem arises as these wirelessly communicating monitoring systems and alarms are plagued with the previously described issues when power is lost. Although backup batteries may allow the audible and visual alarms to continue to function as they are hardwired to the structure of the alarm device, a problem arises when power loss or a similar failure occurs within the network. Additionally, rechargeable batteries cannot readily be used in outdoor environments as current rechargeable batteries are unsafe to operate in the varying outdoor weather conditions. Thus, if a high fluid alarm is in wireless communication with a homeowner through the homeowner's Wi-Fi network and the Wi-Fi network experiences a failure, the user will not receive any information from the alarm over the network and may presume the pump system or fluid level monitoring system is in working order.

Accordingly, there is a desire to those having an ordinary skill in the art to provide a system that removes the need for a separate conduit or power supply and avoids the use or application of a 9 volt DC alkaline backup battery by using wireless health pulse system. It also allows the user to get a notification within minutes that the power to the system has been lost. Further, it is a desire to provide a system that will report that it has lost the internet connection with the WiFi enabled fluid level alarm in addition to providing a fluid level alarm that wirelessly communicates with a homeowner and alerts the homeowner of a high fluid level and general system diagnostics when all systems are in working order.

SUMMARY OF THE INVENTION

The invention described herein is generally a high fluid level alarm system fit for outdoor use while being in communication with a server via a wireless network like Wi-Fi or internet wherein the system sends a pulse of data at preset time intervals when operating correctly. Accordingly, when a scheduled health pulse is not received by the server a warning is sent to the owner of the system being monitored by the high fluid level alarm system. The alarm is preferably used in a sump pump, septic system or similar fluid pump system and has a fluid sensor within the system communicating with the alarm to alert a homeowner when the fluid sensor indicates a certain fluid threshold has been met. The sensor is connected to an alarm box made up of a weather-resistant housing in which the main circuit board is held. The circuit board is made up of a wireless communications module and a computer processor with electronic connections between the communications module and computer processor. The wireless communications module housed within the weather-resistant housing is in operative communication with a central monitoring server that is located in a location remote from the weather-resistant housing. Additionally, the computer processor is in operative communication with the fluid sensor and receives signals therefrom. Depending on the signal sent to the computer processor from the fluid sensor, the processor creates varying messages and instructs the wireless communications module to relay the message to the central monitoring computer server.

The system also includes system verification wherein the central server and computer processor within the water-resistant housing wirelessly communicate at scheduled time intervals with bursts of health pulses containing various sump data. Although embodiments of the health pulses may include particular data depending on sensor type and the environment in which the sensor is used, the primary aspect of the scheduled health pulses is to confirm that the computer processor has power and is connected to the wireless network which allows for wireless communication.

Accordingly, the computer processor creates and sends health pulses at various time intervals to the centralized server. In the event that a health pulse verification is not received by the computer processor confirming that the health pulse was received by the server, the computer processor resends the health pulse. However, if the health pulse is continuously missed over a preset time interval, the system creates a health warning that is sent to the customer associated with the particular sensor according to the means described herein.

In another aspect of the fluid alarm system the centralized monitoring computer server is made up of a processing module, a communication module and a database which stores data within a storage module. Accordingly, the centralized monitoring computer server receives a message sent from the wireless communications module and processes the message in the processing module. Subsequently, the processing module creates a status record based on the message and saves the message and/or status record onto the storage module. Additionally, the processing module creates a communication report that is sent by the communication module to a customer associated with the sensor in which the message originated.

In another aspect of the invention the database contains a set of contact mechanisms for each set of corresponding customers. Accordingly, the database correlates the sensor that originated the message with a particular customer within the set of customers saved in the database. Thus, the communications module within the centralized monitoring system relays the communication report to the customer associated with the sensor.

In another aspect of the present invention the circuit board held within the weather-resistant housing is also designed to be weather resistant as the entire system is intended for outdoor use, although it should be appreciated that such a system can also be used indoors. To further protect against changing weather the entire circuit board holding the wireless communications module and the computer processor is coated in a water-resistant protective coatings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 2A-2C show cross-sectional views of various fluid alarm systems, pump systems and fluid sensors according to the present invention.

FIGS. 3A-3F depict variations of the high fluid alarm according to the present invention FIGS. 4A-4D show detail views of various fluid level sensors according to the present invention.

FIG. 5A is a perspective view of a fluid sensor and pump.

FIG. 5B is a detail view of a fluid level sensor according to the present invention.

DETAILED DESCRIPTION OF THE PREFERRED EMBODIMENTS

Figure 1A:
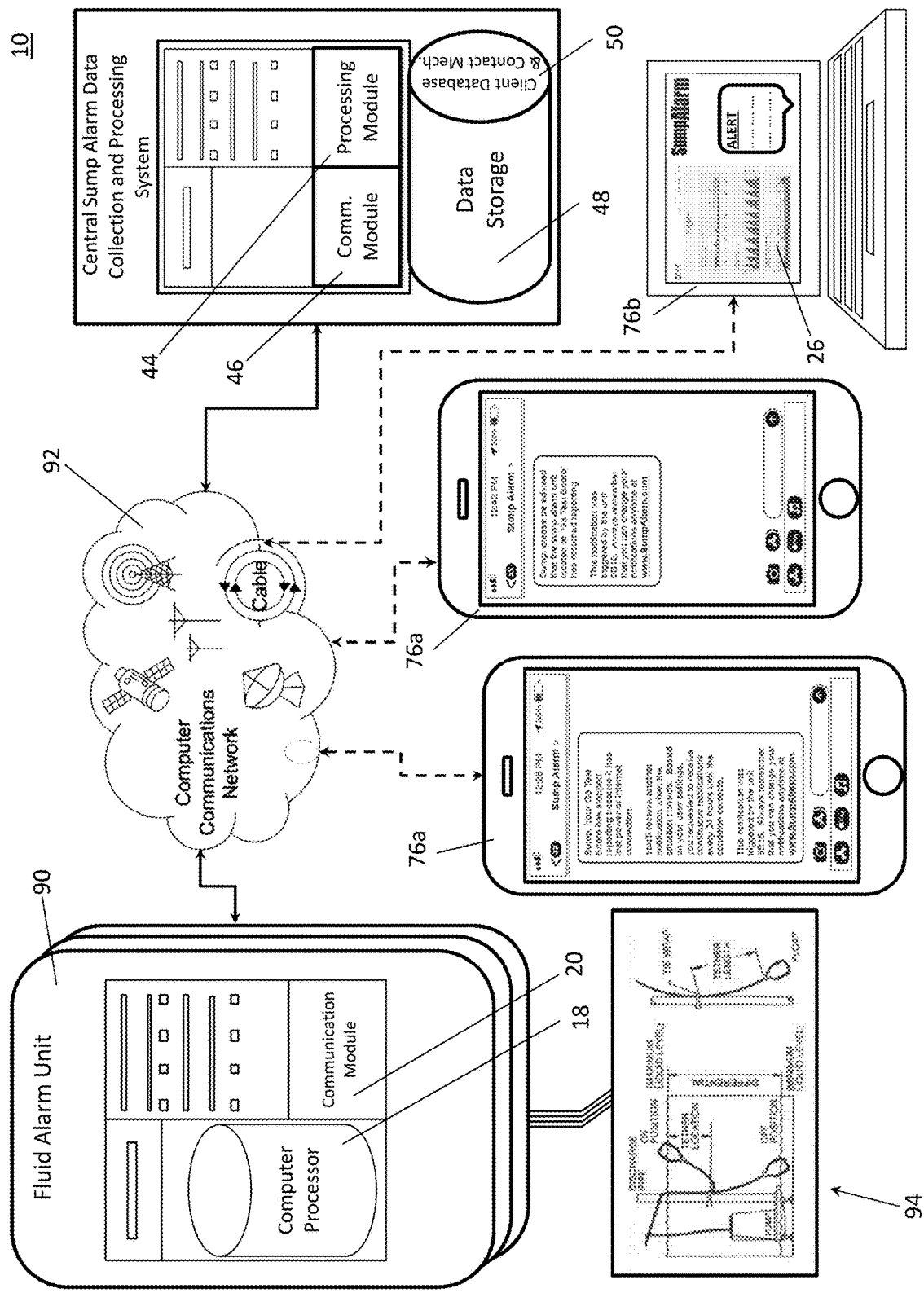
FIG. 1A-1C depict flowcharts of the fluid alarm system for use outdoors in operation according to the present invention.

The following description of the preferred embodiment(s) is merely exemplary in nature and is in no way intended to limit the invention, its application, or uses.

The fluid alarm system is made up of a weather-resistant housing connected to a fluid level sensor which relays signals to a computer processor within the housing which subsequently relays the message to a remote computer server that collects, analysis and further relays a message report to the homeowner over a wireless network 92. Generally, the homeowner receives a message alert from the centralized server of a high fluid level from the fluid alarm installed at his or her residence. As shown in FIGS. 1A-1C and 2A-2C, the status report can be sent to the homeowner through any number of communication methods including a tablet, phone or computer. Accordingly, the message in the preferred embodiment may be in the form of a text message, email or telephone call.

An aspect of the fluid alarm system 10 is the physical fluid monitor located proximate to a fluid reservoir, like a sump 100a or septic tank 100b, within a weather-resistant hosing. The housing 12 is made up of a fluid-resistant material and is intended to be mounted outside of a home, residence or commercial building in order to monitor fluid levels and alert a homeowner or business-owner of high fluid levels. It will be appreciated by those having an ordinary skill in the art that although the fluid alarm described herein is designed for outdoor use it may also be used in indoor settings, for example in the basement of a home.

Extending from the exterior of the weather-resistant housing is a fluid level sensor which monitors the level of a fluid in a fluid basin or similar reservoir 94. In the preferred embodiment the fluid sensor 14 is a float switch 14*a* as commonly used in known pump alarms and shown in FIG. 4A, however, other types of fluid level sensors may also be used. For example, conductivity probes 14*c* made of high grade stainless steel conductivity sensors 112 and a weatherized shrink wrapped boot 114 which can be used to detect fluid levels within a reservoir as shown in FIGS. 3C, 4C and 5. Generally, these probes work within clean water where there is no debris and thus may be used in place of the float switch in particular situations. Alternatively, a clamp float switch 14*b*, shown in FIG. 4B, which connects to a sump discharge pipe 106 by a mounting bracket 108 to give a high level alarm can be used in addition to a water leak floor sensor 14*d*, shown in FIG. 4D, which detects a water leak when water touches both metal pads. In operation the water 116 leak floor sensor behaves as an open circuit when no water is present, and behaves as an approximately 1.4MΩ resistor when water is present.

The sensor measures the fluid level and relays a signal 42 to a computer processor 18 situated within the weather-resistant housing. After receiving the signal from the fluid sensor the computer processor creates a message based on the signal which ultimately is relayed to the homeowner. Thus, the computer processor can evaluate the signal and send the corresponding processed message to the server. Alternatively, the computer processor can format the message with the unprocessed signal that the monitoring computer server can evaluate. Accordingly, a wireless communication module 20 is also situated within the interior 38 of the weather-resistant housing and is in operative communication with the computer processor via a printed circuit board 22 ("PCB") and electronic connections 60. Additionally, other embodiments have a data storage memory within the PCB that is in operative communication with the computer server. The PCB also has a wiring connection 98*a* linking the PCB to the fluid sensor, an AC power connection 98*b* and a power supply 98*c* as shown in FIG. 3C.

In another embodiment the alarm system may have in addition to or in place of the fluid sensor other sensors that monitor data within a sump, septic system, ejector, grinder, irrigation or other similar fluid system where data relating to the various sensors is sent in each health pulse and saved in the server and accessed by the user. For example, variations of the invention could be made to report additional data, such as temperature, humidity, pump amperage, or control the pump 110, and alarm "test" and "silence" conditions to be controlled remotely. Subsequently, the computer processor instructs the wireless communications module to send the message through the system described herein.

The wireless communication module within the weather-resistant housing is in operative communication with a centralized monitoring computer server 16 located in a separate location from the physical fluid alarm and fluid sensor. Accordingly, the centralized monitoring computer server has a communication module that receives the message sent from the communication module 46 in the weather-resistant housing in addition to a processing module 44 that interprets the message from the communications module and processes the message within the computer server. In the preferred embodiment the message is sent from the communication module within the housing to a local access point which uses the internet connection to relay the message to the centralized monitoring computer. Accordingly, the alarm broadcasts its own wireless network and the homeowner simply uses their home computer, tablet or data phone to wirelessly connect to the alarm and connect it to their home network.

After the message is received by the centralized computer server the processing module creates a status record 24 based on the message and preferably saves the message into a storage module within the computer server. In another embodiment the processing module may save the message itself in the storage module rather than the created message. For example, a message from the computer processor may be a standard system update, such as the health pulse described below, where the data transferred does not include any high fluid level or similar warning. Accordingly, there is no status record to be created and the message itself is saved as a general check that the processor did in fact send a scheduled message. As described below with respect to the health pulse aspect of the invention, when a general check is missed the processor in the centralized server will flag the missed report through the verification notice system and create a status record for the same. Additionally, the processing module creates a communication report 26 that is sent by the communication module in the centralized monitoring server to a customer associated with the sensor that sent the original signal.

In another aspect of the invention the database contains a set of contact mechanisms 54 for each set of corresponding customers 52 saved within the storage data storage module 48. Accordingly, the database 50 within the data storage module correlates the sensor that originated the message with a particular customer 56 within the set of customers saved in the database. Thus, the communications module within the centralized monitoring system relays the communication report to the customer associated with the sensor. As described above, the communication module can send a variety of messages including telephonic messages through a voice telephone number, text messages through a text message address, emails through an email address and any other similar message type. Accordingly, the communication report will be sent out according to what type of contact mechanism the homeowner has associated with their account. For example, when a homeowner registers their fluid-alarm device 96 they may elect to select a text message as the preferred commination mechanism, thus it is up to the homeowner to elect which type of message they would like to receive. Additionally, the homeowner may elect to have multiple communication mechanisms, in which case the communication module will send multiple commination reports through the selected mechanisms.

During operation, the communication module in the alarm sends a message 32 to the centralized monitoring computer server when the fluid sensor detects a high fluid level. Subsequently, the alerts described herein are sent to the homeowner who may respond to the situation accordingly. However, in another embodiment the homeowner may control the alarm system through an app or internet connection as described below. As explained herein, the message sent from the computer processor may be a message 32*a* in response to a signal from the fluid sensor or may be a health pulse message 32*b* that is sent upon the expiration of the set time interval. Accordingly, although the message may be sent after various prompts, each message is sent after the computer processor instructs the communication module to send the message the centralized monitoring computer server.

In any case it is an aspect of the alarm system to periodically send a health pulse 28 of data at set time intervals 80 to the monitoring computer server. The server is programmed such that if it does not receive the scheduled health pulse data message from the unit 90 at the end of the time interval, it will send warning notifications via phone, text or email to the user to let them know that the system has lost power or network connection. Accordingly, this health pulse operates to notify the homeowner of potential problems with their system when the system has lost all power or when the system has lost its network connection in addition to notifying the user of high fluid levels and other relevant system data when the system is operating correctly. Of course, the alarm system described herein can be outfitted with a traditional auxiliary battery but the health pulse function provides a back-up verification system which operates in any condition regardless of whether the auxiliary battery is used. This is particularly useful as traditional lithium ion backup batteries are not suitable for the temperatures involved in outdoor service.

In operation, the health pulse is created within the computer processor in the alarm system when the time interval is met. The time interval is set within the system and may be customized by the user depending on how often the health pulse should be sent from the computer processor to the server. In units where the health pulse is sending more detailed sensor or unit data, it may be more desirable to set a shorter interval than units which merely verify the unit has power and network connection. Regardless of whether detailed unit data relating to sensor or pump information is sent in each health pulse, it should be appreciated that the health pulse also includes unit wireless signal strength which allows the server to determine if a signal is weakening and a future missed health pulse is likely caused by a poor signal. Other units can send other detailed information relating to unit internal and external temperature, processor erasable programmable read-only memory ("EPROM") information or other pertinent system details that may be applicable for various users.

In the preferred system, the computer processes instructs the wireless communication module to send the scheduled health pulse to the centralized monitoring computer server where the health pulse is processed by the processing module and saved in the data storage module. In response to the health pulse received from the computer processor, the server sends a health pulse verification notice 30 to the computer processor and the time interval is reset. If the computer processor does not receive the verification within another set time interval 82, the health pulse is automatically resent until a pulse verification notice is received. After the expiration of the second time interval set by the user, the server determines the unit has lost power 88a or network connection 88b and a health warning report 36 is created and sent to the user via a contact machismo set by the user.

Figure 1B:
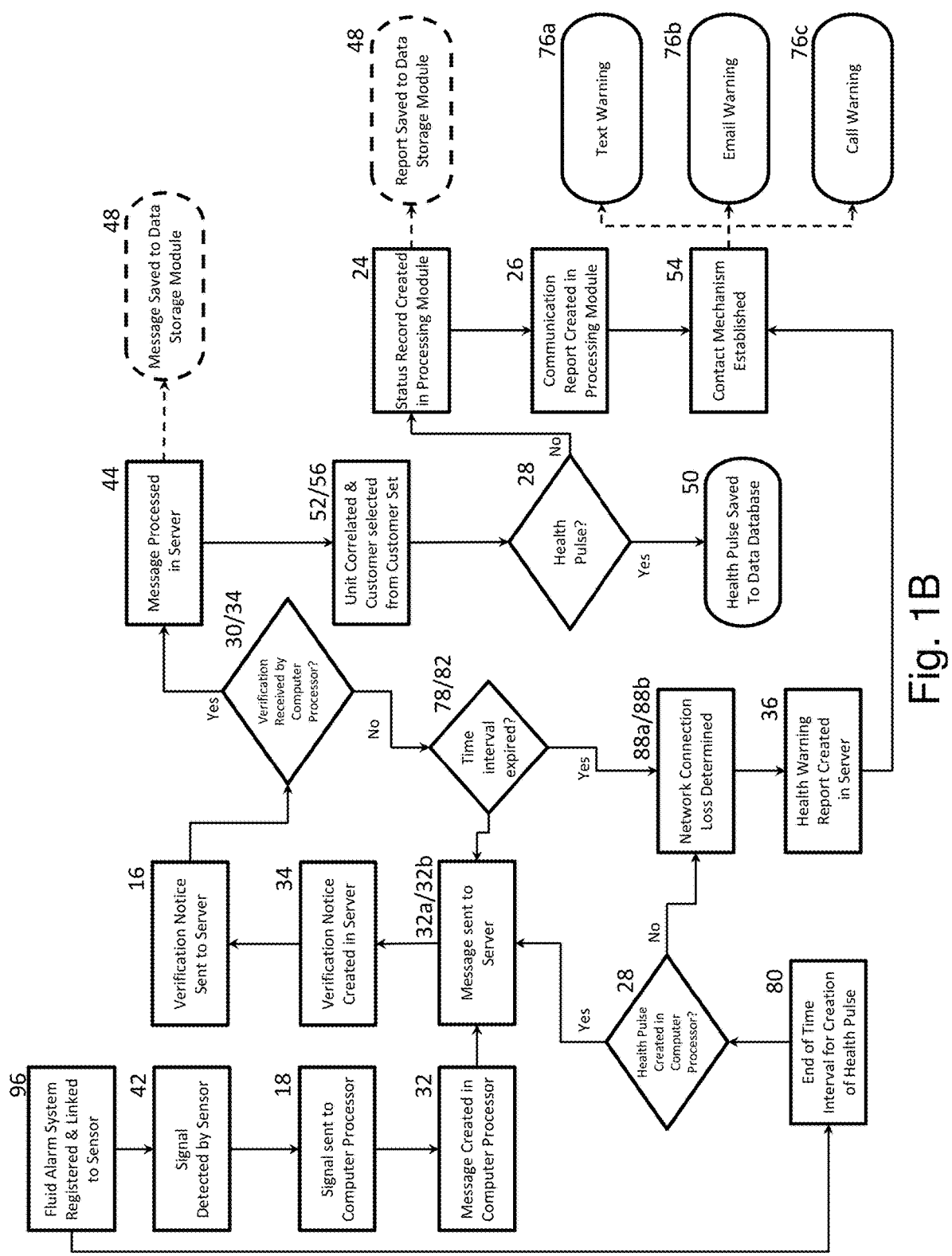

In an alternative embodiment, if the time interval for receipt of the health pulse ends and no health pulse has been sent by the computer processor or received by the server, the centralized server may send a health pulse notice to the computer processor to verify that the system is operational rather than the computer processor automatically resending the health pulse. If the computer processor receives the notice, the system is prompted to recreate and resend the health pulse, which indicates the system has not experienced loss of power or loss of network issues. In comparison, if the computer processor does not resend the health pulse or the health pulse is not received by the server after the notice is sent, the central server creates a health warning report indicating a problem exists with the sump alarm that is sent to the customer through one of the multiple contact methods discussed herein. Accordingly, the server-side backup verifies within each time interval that the system has power and is connected to the network.

Where the scheduled health pulses and verification determine whether the alarm is in working order, the system also verifies receipt of all messages between the computer processor and server by sending a verification notice 34 to the computer processor within the alarm after receiving a message, as illustrated in the flowchart in FIG. 1B. Subsequently, the computer processor checks for the verification notice after having sent the message and resends the message to the centralized monitoring computer in the event that the verification notice is not received within a set period of time 78. Accordingly, both the centralized monitoring computer and the computer processor have secondary checks to ensure the messages are received. In the case where the verification notice is not received from the centralized monitoring computer or the centralized computer does not receive the health pulse message from the computer processor at a set interval, the processing module creates a communication report to be sent to the customer notifying them that the alarm system has missed a health pulse and there is a failure within the system. Accordingly, the alarm system alerts the user when there is a network or power failure.

In addition to the alert sent to the homeowner via text, call or email the fluid-resistant alarm system also has a physical alarm 64 connected to the weather-resistant housing. When there is a high level alarm sent from the fluid sensor the physical alarm sounds an audible alarm 68 and visual light 66, as traditional units have done, but also sends that data to the centralized server, which sends notifications to preprogrammed email addresses, text message numbers, and/or voice lines depending on how the user has configured their settings. In operation, the physical alarm is controlled by the computer processor and alerts a nearby homeowner when the fluid sensor sends a warning that a certain fluid threshold has been met in addition to an alert being sent through the various communication mechanisms described above. The physical alarm can be any number of alerts but generally includes at least one visual cue and/or an audio cue. For example, the preferred visual cue is a flashing light attached to the exterior 40 surface of the housing and the auditory cue is a horn that sounds a series of blasts when the fluid sensor detects a high fluid level. Additionally, the visual cue may also be a gauge alert or a pop-up alert.

Another aspect of the alarm system is the particular weather resistant features built into the fluid-resistant alarm. As the alarm is intended to be used outside, it is particularly designed to withstand and operate in all whether conditions including extreme cold, heat, rain, snow. To protect against these various weather conditions the housing is an outdoor enclosure and preferably has an International Protection Marking ("IP") of sixty-five (65) or sixty-six (66). Additionally, the surface of the PCB 58 that is held within then housing is coated in multiple weather resistant protective layers. The coating 62 used on the PCB may include but is not limited to an acrylic coating, urethane coating, and/or a silicone coating. Regardless, the coating allows the board to withstand moisture, for example dew, condensation or fluid intrusion should the weather-resistant housing fail, as well as any rapid temperature changes.

Figure 3F:
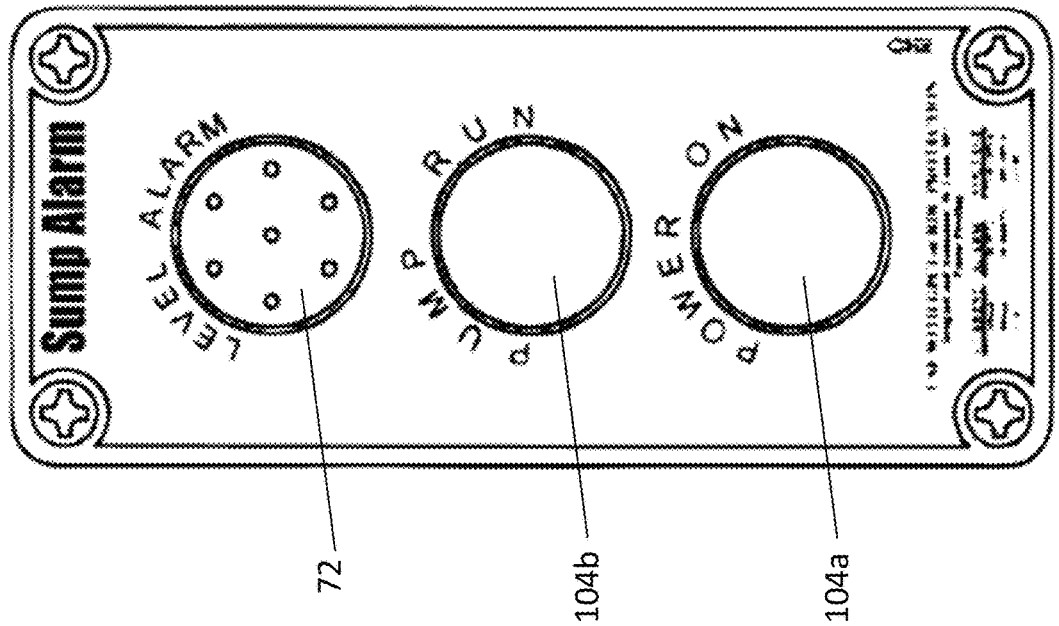

The weather-resistant housing also consists of multiple breather holes 70 on the exterior of the housing in order to provide ventilation to the computer processor within the housing as shown in FIG. 3B. The breather holes extend from the exterior of the housing to the interior of the housing and are preferably positioned proximate to the physical alarm. The breather holes and physical alarm are preferably covered by a cover 72 connected to the exterior housing, shown in FIGS. 3A, 3E and 3F. In operation the breather holes function to provide temperature equalization between the interior of the housing and the exterior. Additionally, the breather holes may act as pressure vents or similar ventilation holes means. The cover is removeably attached to the exterior and covers the breather holes and the physical alarm. However, the cover has multiple holes 74 thereon to allow air to pass through both the cover and the breather holes to continuously facilitate ventilation. In operation, the cover predominately acts as another fluid-resistant barrier to prevent fluid from entering the housing through the breather holes as well as a protective cover for the physical alarm.

Figure 3E:
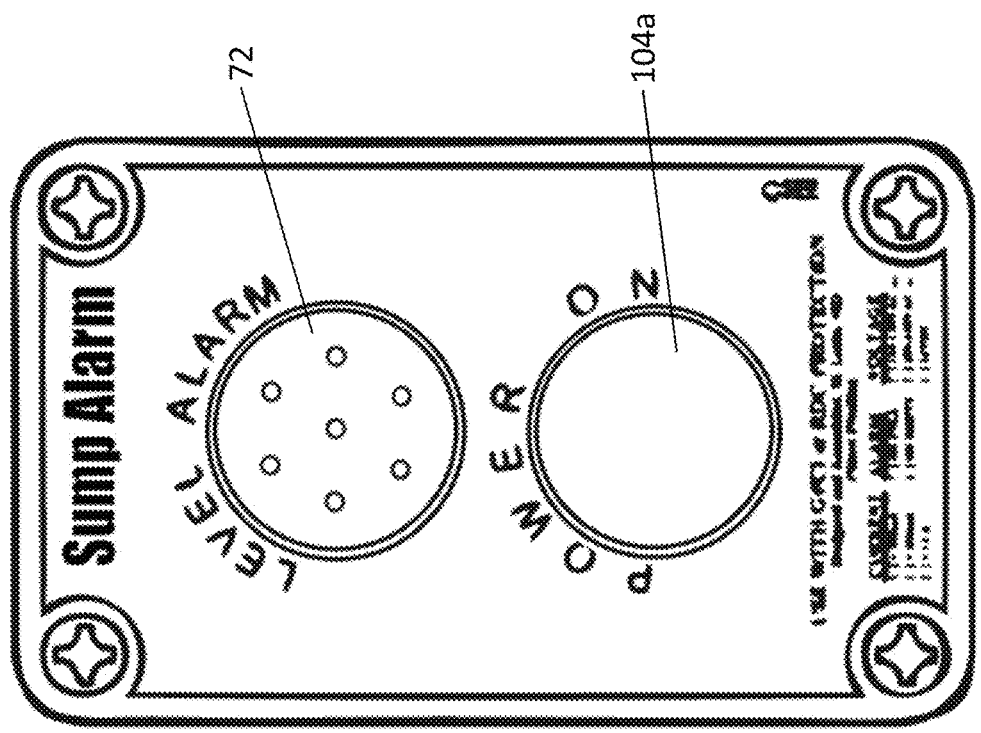

Additionally, the weather-resistant housing may be outfitted with other controls aside from the aforementioned visual and audible alarm and cover. For example, as shown in FIGS. 3E and 3F the housing may also have a power buttons 104a, switches or similar mechanism that allows a homeowner to power the alarm on and off. Similarly, the housing may have power indicator light that let the homeowner know when the system has power. Additionally, the housing may also be outfitted with a pump controlling mechanism and/or indicator light 104b, such as the pump "run" indicator light shown in FIG. 3F. The housing also has a weather-resistant cable entry 102 for power cords and sensor wires as shown in FIGS. 3C and 3D. Of course, as the housing is intended to be weather-resistant and fit for outdoor use, these additional features and controls are similarly designed to prevent water and other debris from entering the interior of the housing.

Figure 1C:
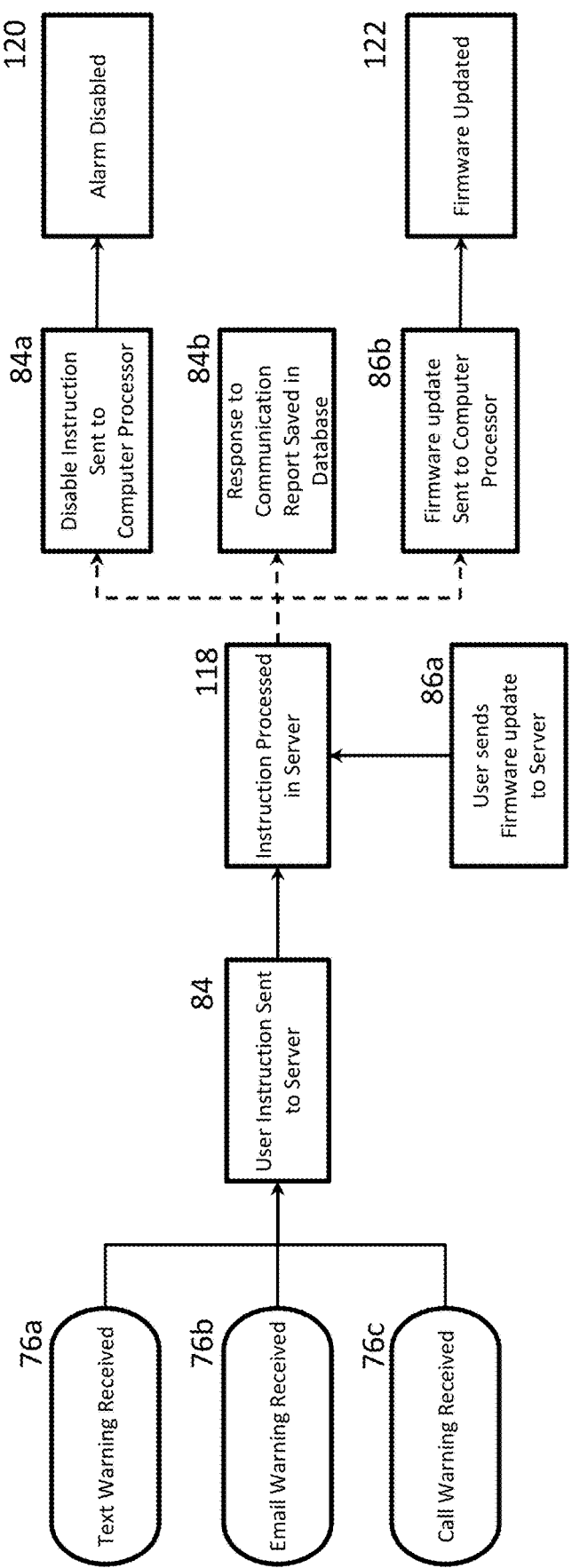

In another embodiment the alarm system also includes a means for the customer to provide an instruction 84 to the alarm system through the computer processor via the centralized monitoring computer wherein the instruction is processed in the server 118 and sent to the unit. For example, as shown in FIG. 1C, the customer may have a controlling means for providing instructions or commands to respond to the device, such as sending 84a "silence" commands to disable 120 the audible alarm or turn off the visual alarm or to respond to the communication report 84b. Similarly, other instructions can be provided to the server or alarm unit relative to the information received in the communication report. Additionally, firmware updates 86a can be sent to the computer processor from the centralized monitoring computer which may be in turn relayed to the computer processor 86b and subsequently used to update the firmware 122. Accordingly, the system provides a means for the customer to not only be notified of alerts via the communication mechanism but also to control the alert system. In one embodiment the customer can send these instructions through a phone call 76c, text message 76a or email 76b but it should appreciated that another embodiment may have an app associated with the alarm system that allows the customer to control the alarm system remotely.

Accordingly, another variation of the alert system may include a connection between the sensor, centralized monitoring computer and customer app that allows the customer to track real time variables being collected by the fluid sensor and relayed through the network described herein when the health pulse is received by the server. In operation, the centralized monitoring computer will continuously or intermittently receive health pulse messages from the computer processor and record, aggregate and average the messages received within the processing module into a set of variables that can be compared to historical data for the associated fluid system, weather data and/or absolute values defined for the app. In one embodiment the server stores data on the pump and aggregates the data to create a pump performance history. Similarly, the data can be collected and processed to relay fluid level information that allows the user to see historical data from their app. For example, the app may be used to show precipitation levels, temperature, pump run time per inch of rain fall, pump cycles and pump max run time along with any other data collected by the fluid sensor.

Accordingly, the present invention improves upon the standard outdoor high fluid alarm that has traditionally used an AC power source and a 9 VDC alkaline battery as a back-up and relay logic or direct switching from a float switch an audible alarm and/or a light to alert the homeowner but are unable to alert the homeowner while they are away or in the case where the system loses network connection or power. Also, most other outdoor high level alarms are wired back to the panel that controls the pump and not Wi-Fi enabled due to the challenges with putting electronics into an outdoor environments. Instead, the alarm system described herein allows detection products to be located in the field, i.e. at the pumps, as they are weather-resistant and suitable for outdoor use. Additionally, the alarm system alerts the homeowner of power loss, internet loss, and high level detection while reducing the need for excess wiring given the wireless network described herein.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, although the present invention is discussed with reference to liquid fluids, the present invention could be used with gaseous fluids; additionally, the present invention could be used for other types of fluid level alarms, such as the pressure level for liquids or for gasses that are being stored in tanks or are flowing through conduits. Thus, the breadth and scope of the present invention should not be limited by any of the above-described exemplary embodiments, but should be defined only in accordance with the following claims appended hereto and their equivalents.

What is claimed is:

1. A fluid alarm system for use outdoors, comprising:
    a weather-resistant housing having an interior space and an exterior surface;
    a fluid sensor positioned outside of the weather-resistant housing, wherein the sensor produces a signal;
    a centralized monitoring computer server located distally from the weather-resistant housing, wherein the centralized monitoring computer server is comprised of a processing module, a communications module, and a database in a data storage module, wherein the database contains a set of contact mechanisms for a corresponding set of customers, wherein the database correlates the fluid sensor with a particular customer in the set of customers;

a wireless communications module situated within the interior space of the weather-resistant housing, wherein the wireless communications module is in operative communication with the central monitoring server, a computer processor situated within the interior space of the weather-resistant housing, wherein the computer processor is in operative communication with the fluid sensor and the wireless communications module, wherein the computer processor receives the signal, creates a message based on the signal, and instructs the wireless communications module to send the message to the centralized monitoring computer server;

a circuit board on which the wireless communications module and the computer processor are attached, wherein the circuit board is further comprised of a plurality of electronic connections on a surface of the circuit board between the wireless communications module and the computer processor and a fluid-resistant coating covering the surface and the electronic connections;

a status record created by the processing module when the message is received by the communications module in the centralized monitoring computer server, wherein at least one of the status record and the message is saved within the data storage module;

a communication report created by the processing module in the centralized monitoring computer server and sent to one or more of the contact mechanisms for the particular customer corresponding to the fluid sensor that created the signal;

a health pulse created by the computer processor within a set time interval, wherein the computer processor instructs the wireless communications module to send the health pulse to the centralized monitoring computer server, and wherein the health pulse is saved within the data storage module in response to receipt of the health pulse; and a health warning report created by the processing module in the centralized monitoring computer server when the health pulse is not received within the set time interval, and wherein the health warning report is sent to one or more of the contact mechanisms for the particular customer corresponding to the fluid sensor.

2. The fluid alarm system of claim 1, wherein the fluid sensor is comprised of a fluid level sensor.

3. The fluid alarm system of claim 1, wherein the weather-resistant housing further comprises a physical alarm controlled by the computer processor, wherein the physical alarm is at least one of a visual cue and an aural cue, and wherein the visual cue is at least one of a light alert, a gauge alert, and a pop-up alert, and the aural cue is a sound alert.

4. The fluid alarm system of claim 1, wherein the weather-resistant housing further comprises a breather hole, wherein the breather hole extends through the weather-resistant housing from the exterior surface to the interior space.

5. The fluid alarm system of claim 1, further comprising a physical alarm connected to the weather-resistant housing, a cover connected to the exterior surface of the weather-resistant housing and extending over the physical alarm, and a breather hole in a section of the weather-resistant housing under the cover, wherein the breather hole extends through the weather-resistant housing from the exterior surface to the interior space, and wherein the cover is comprised of a plurality of apertures.

6. The fluid alarm system of claim 1, wherein the contact mechanisms are further comprised of a text message address, an email address, and a voice phone number.

7. The fluid alarm system of claim 1, wherein the centralized monitoring computer sends a verification notice to the computer processor through the wireless communications module after having received the message, wherein the computer processor checks for the verification notice after having sent the message, and wherein the computer processor resends the message to the centralized monitoring computer in the event that the verification notice is not received within a set period of time.

8. The fluid alarm system of claim 1, wherein the particular customer provides an instruction to the computer processor through the centralized monitoring computer, wherein the instruction at least one of disables the physical alarm and responds to the communication report.

9. The fluid alarm system of claim 1, wherein the centralized monitoring computer sends a firmware update to the computer processor.

10. A fluid alarm system for use outdoors, comprising:
a weather-resistant housing having an interior space and an exterior surface;

a fluid sensor positioned outside of the weather-resistant housing, wherein the sensor produces a signal;

a centralized monitoring computer server located distally from the weather-resistant housing, wherein the centralized monitoring computer server is comprised of a processing module, a communications module, and a database in a data storage module, wherein the database contains a set of contact mechanisms for a corresponding set of customers, wherein the database correlates the fluid sensor with a particular customer in the set of customers;

a wireless communications module situated within the interior space of the weather-resistant housing, wherein the wireless communications module is in operative communication with the central monitoring server;

a computer processor situated within the interior space of the weather-resistant housing, wherein the computer processor is in operative communication with the fluid sensor and the wireless communications module, wherein the computer processor receives the signal, creates a message based on the signal, and instructs the wireless communications module to send the message to the centralized monitoring computer server;

a circuit board on which the wireless communications module and the computer processor are attached, wherein the circuit board is further comprised of a plurality of electronic connections on a surface of the circuit board between the wireless communications module and the computer processor and a fluid-resistant coating covering the surface and the electronic connections;

a status record created by the processing module when the message is received by the communications module in the centralized monitoring computer server, wherein at least one of the status record and the message is saved within the data storage module;

a communication report created by the processing module in the centralized monitoring computer server and sent to one or more of the contact mechanisms for the particular customer corresponding to the fluid sensor that created the signal;

a health pulse created by the computer processor within a set time interval, wherein the computer processor instructs the wireless communications module to send the health pulse to the centralized monitoring computer server, wherein the health pulse is saved within the data storage module in response to receipt of the health pulse, wherein the health pulse further comprises at least one of a wireless signal strength and a set of fluid sensor data, and wherein the set of fluid sensor data comprises at least one of a fluid level and a fluid temperature.

11. The fluid alarm system of claim 10, further comprising a health warning report created by the processing module in the centralized monitoring computer server when the health pulse is not received within the set time interval, and wherein the health warning report is sent to one or more of the contact mechanisms for the particular customer corresponding to the fluid sensor.

12. The fluid alarm system of claim 10, further comprising a physical alarm connected to the weather-resistant housing, a cover connected to the exterior surface of the weather-resistant housing and extending over the physical alarm, and a breather hole in a section of the weather-resistant housing under the cover, wherein the breather hole extends through the weather-resistant housing from the exterior surface to the interior space, and wherein the cover is comprised of a plurality of apertures.

13. The fluid alarm system of claim 10, wherein the centralized monitoring computer sends a verification notice to the computer processor through the wireless communications module after having received the message, wherein the computer processor checks for the verification notice after having sent the message, and wherein the computer processor resends the message to the centralized monitoring computer in the event that the verification notice is not received within a set period of time.

14. A fluid alarm system for use outdoors, comprising:
- a weather-resistant housing having an interior space and an exterior surface;
- a fluid sensor positioned outside of the weather-resistant housing, wherein the sensor produces a signal;
- a centralized monitoring computer server located distally from the weather-resistant housing, wherein the centralized monitoring computer server is comprised of a processing module, a communications module, and a database in a data storage module, wherein the database contains a set of contact mechanisms for a corresponding set of customers, wherein the database correlates the fluid sensor with a particular customer in the set of customers;
- a wireless communications module situated within the interior space of the weather-resistant housing, wherein the wireless communications module is in operative communication with the central monitoring server;
- a computer processor situated within the interior space of the weather-resistant housing, wherein the computer processor is in operative communication with the fluid sensor and the wireless communications module, wherein the computer processor receives the signal, creates a message based on the signal, and instructs the wireless communications module to send the message to the centralized monitoring computer server;
- a circuit board on which the wireless communications module and the computer processor are attached, wherein the circuit board is further comprised of a plurality of electronic connections on a surface of the circuit board between the wireless communications module and the computer processor and a fluid-resistant coating covering the surface and the electronic connections;
- a status record created by the processing module when the message is received by the communications module in the centralized monitoring computer server, wherein at least one of the status record and the message is saved within storage module;
- a communication report created by the processing module in the centralized monitoring computer server and sent to one or more of the contact mechanisms for the particular customer corresponding to the fluid sensor that created the signal;
- a health pulse created by the computer processor within a set time interval, wherein the computer processor instructs the wireless communications module to send the health pulse to the centralized monitoring computer server, and wherein the health pulse is saved within the data storage module in response to receipt of the health pulse within the set time interval by the communications module in the centralized monitoring computer server; and
- a health pulse verification created by the processing module in the centralized monitoring computer server when the health pulse is received within the set time interval, wherein the health pulse verification is sent to the computer processor through the wireless communication module, and wherein the computer processor resends the health pulse to the centralized monitoring computer in the event that the health pulse verification is not received from the centralized monitoring computer server after the expiration of another set time interval; and
- a health warning report created by the processing module in the centralized monitoring computer server when the health pulse is not received within the set time interval, and wherein the health warning report is sent to one or more of the contact mechanisms for the particular customer corresponding to the fluid sensor.

15. The fluid alarm system of claim 14, wherein the centralized monitoring computer sends a confirmation verification notice to the computer processor through the wireless communications module after having received the message based on the signal, wherein the computer processor checks for the confirmation verification notice after having sent the message, and wherein the computer processor resends the message to the centralized monitoring computer in the event that the verification notice is not received within a set period of time.

16. The fluid alarm system of claim 14, wherein the health warning report is at least one of a power loss warning and a network loss warning.

17. A fluid alarm system for use outdoors, comprising:
- a weather-resistant housing having an interior space and an exterior surface;
- a fluid sensor positioned outside of the weather-resistant housing, wherein the sensor produces a signal;
- a centralized monitoring computer server located distally from the weather-resistant housing, wherein the centralized monitoring computer server is comprised of a processing module, a communications module, and a database in a data storage module, wherein the database contains a set of contact mechanisms for a corresponding set of customers, wherein the database correlates the fluid sensor with a particular customer in the set of customers;
- a wireless communications module situated within the interior space of the weather-resistant housing, wherein the wireless communications module is in operative communication with the central monitoring server;
- a computer processor situated within the interior space of the weather-resistant housing, wherein the computer processor is in operative communication with the fluid sensor and the wireless communications module, wherein the computer processor receives the signal, creates a first message based on the signal, and instructs the wireless communications module to send the first message to the centralized monitoring computer server, and wherein the computer processor creates a second message and instructs the wireless communications module to send the second message to the centralized monitoring computer server within a set time interval;

a circuit board on which the wireless communications module and the computer processor are attached, wherein the circuit board is further comprised of a plurality of electronic connections on a surface of the circuit board between the wireless communications module and the computer processor and a fluid-resistant coating covering the surface and the electronic connections;

a status record created by the processing module when one of the first message and the second message is received by the communications module in the centralized monitoring computer server, wherein at least one of the status record, the first message, and the second message are saved within storage module; and a communication report created by the processing module in the centralized monitoring computer server and sent to one or more of the contact mechanisms for the particular customer corresponding to the fluid sensor that created the signal.

18. The fluid alarm system of claim 17, further comprising a health pulse verification created by the processing module in the centralized monitoring computer server when the second message is received within the set time interval, wherein the health pulse verification is sent to the computer processor through the wireless communication module, and wherein the computer processor resends the second message to the centralized monitoring computer server in the event that the health pulse verification is not received from the centralized monitoring computer server after the expiration of another set time interval.

19. The fluid alarm system of claim 18, wherein a health warning report is created by the processing module in the centralized monitoring computer server when the second message is not received within the set time interval, wherein the health warning report is sent to one or more of the contact mechanisms for the particular customer corresponding to the fluid sensor, and wherein the health warning report is at least one of a power loss warning and a network loss warning.

20. The fluid alarm system of claim 17, further comprising a physical alarm connected to the weather-resistant housing, a cover connected to the exterior surface of the weather-resistant housing and extending over the physical alarm, and a breather hole in a section of the weather-resistant housing under the cover, wherein the breather hole extends through the weather-resistant housing from the exterior surface to the interior space, and wherein the cover is comprised of a plurality of apertures.

* * * * *